United States Patent
Kim et al.

(10) Patent No.: US 8,001,467 B2
(45) Date of Patent: Aug. 16, 2011

(54) METHOD OF INPUTTING LETTER IN MOBILE TERMINAL THROUGH EXTRACTION OF PROPOSED LETTER SET

(75) Inventors: Jong Min Kim, Suwon-si (KR); Gwang Woo Choe, Suwon-si (KR); Ho Jin Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1133 days.

(21) Appl. No.: 11/801,160

(22) Filed: May 9, 2007

(65) Prior Publication Data
US 2007/0271529 A1 Nov. 22, 2007

(30) Foreign Application Priority Data
May 19, 2006 (KR) .................. 10-2006-0045208

(51) Int. Cl.
*G06F 17/00* (2006.01)
*G06F 3/02* (2006.01)
(52) U.S. Cl. ........ 715/255; 715/261; 715/773; 715/816; 345/168; 345/169
(58) Field of Classification Search .......... 715/200–202, 715/204, 205, 243, 254, 256, 259, 263, 268, 715/273, 700, 739, 740, 773, 784, 786, 802, 715/803, 860, 207, 209, 210, 226, 229, 230, 715/231, 234, 252, 253, 255, 274, 713, 731, 715/760–763, 778, 817, 819, 822, 823, 826–828, 715/831, 851; 345/168, 169, 170, 171, 172, 345/173, 594
See application file for complete search history.

(56) References Cited

U.S. PATENT DOCUMENTS

| | | | | |
|---|---|---|---|---|
| 5,797,098 A | * | 8/1998 | Schroeder et al. | 455/464 |
| 6,005,495 A | * | 12/1999 | Connolly et al. | 341/22 |
| 6,011,554 A | * | 1/2000 | King et al. | 715/811 |
| 6,219,731 B1 | * | 4/2001 | Gutowitz | 710/67 |
| 7,014,099 B2 | * | 3/2006 | Crisan | 235/60 R |

(Continued)

FOREIGN PATENT DOCUMENTS
EP 0679003 A2 * 10/1995
(Continued)

OTHER PUBLICATIONS
A. Sirisena, "Mobile Text Entry", Nov. 2002, 41 pages.*

*Primary Examiner* — Doug Hutton
*Assistant Examiner* — Maikhanh Nguyen
(74) *Attorney, Agent, or Firm* — The Farrell Law Firm, P.C.

(57) ABSTRACT

Disclosed is a method of inputting letters in a mobile terminal by using letter keys each of which has at least one letter allocated thereto. In the method, after there is an input of at least two letter keys, first proposed letter sets are extracted from combinations of letters allocated to the input letter keys, and one of the extracted first proposed letter sets is selected. When there is a further input of the letter key, the first proposed letter sets are further extracted by combining the selected first proposed letter set with letters allocated to the further input letter key. One of the further extracted first proposed letter sets is selected and the selected letter set is received as input data.

22 Claims, 12 Drawing Sheets

U.S. PATENT DOCUMENTS

| | | | |
|---|---|---|---|
| 7,048,456 B2 * | 5/2006 | Keinonen et al. | 400/495 |
| 7,083,342 B2 * | 8/2006 | Griffin | 400/485 |
| 7,116,311 B2 * | 10/2006 | Martinez et al. | 345/168 |
| 7,202,802 B2 * | 4/2007 | Salman et al. | 341/22 |
| 7,202,853 B2 * | 4/2007 | Ng et al. | 345/168 |
| 7,224,292 B2 * | 5/2007 | Lazaridis et al. | 345/168 |
| 7,320,111 B2 * | 1/2008 | Volovitz | 715/827 |
| 7,355,589 B2 * | 4/2008 | Eo et al. | 345/168 |
| 7,395,512 B2 * | 7/2008 | Makabe et al. | 715/816 |
| 7,656,316 B2 * | 2/2010 | Lazaridis et al. | 341/22 |
| 7,800,587 B2 * | 9/2010 | Kato | 345/168 |
| 2002/0077808 A1 * | 6/2002 | Liu et al. | 704/10 |
| 2003/0048894 A1 * | 3/2003 | Mager | 379/353 |
| 2005/0270292 A1 * | 12/2005 | You | 345/467 |
| 2006/0058943 A1 * | 3/2006 | Pascual et al. | 701/200 |
| 2006/0242576 A1 * | 10/2006 | Nagel et al. | 715/535 |
| 2007/0126702 A1 * | 6/2007 | Griffin et al. | 345/168 |

FOREIGN PATENT DOCUMENTS

| | | | |
|---|---|---|---|
| GB | 2349725 A * | 11/2000 | |
| KR | 1020030002983 | 1/2003 | |
| KR | 1020050106613 | 11/2005 | |
| KR | 1020060011712 | 2/2006 | |
| WO | WO 01/31788 A1 * | 5/2001 | |
| WO | WO 03/081366 | 10/2003 | |
| WO | WO 2004/084528 A1 * | 9/2004 | |
| WO | WO 2005/053173 A1 * | 6/2005 | |

* cited by examiner

METHOD OF INPUTTING LETTER IN MOBILE TERMINAL THROUGH EXTRACTION OF PROPOSED LETTER SET

PRIORITY

This application claims priority under 35 U.S.C. §119 to Korean Patent Application No. 2006-45208, which was filed in the Korean Intellectual Property Office on May 19, 2006, the contents of which are incorporated by reference herein in its entirety.

BACKGROUND OF THE INVENTION

1. Field of the Invention

The present invention relates generally to a letter input method for a mobile terminal and, more particularly, to a method of inputting a letter through extraction of proposed letter sets corresponding to key input data in a mobile terminal having a keypad in which several letters are allocated to each key.

2. Description of the Related Art

In general a keyboard, a typical input device of a computer, has a single key arrangement in which a single letter is allocated to each key. A mobile terminal such as a mobile phone or a Personal Digital Assistant (PDA), however, has in general a multiple key arrangement in which several letters are allocated to each key, since a keypad is relatively limited in space.

Figure 1A:
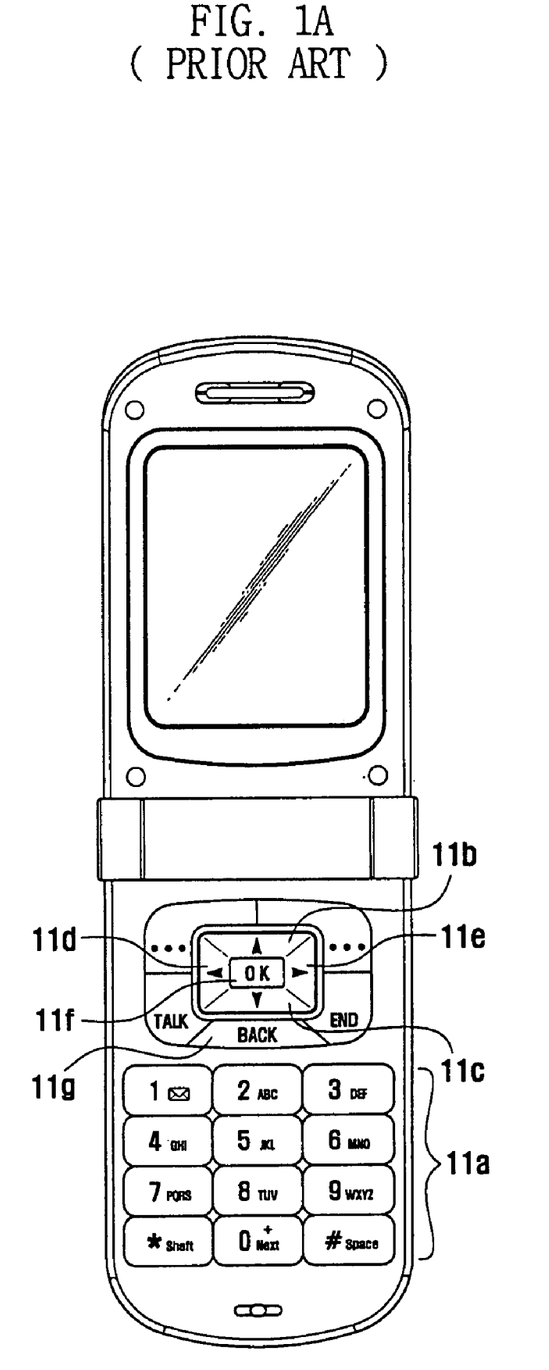
FIGS. 1A and 1B are schematic views showing two types of keypads of a conventional mobile terminal.
Figure 1B:
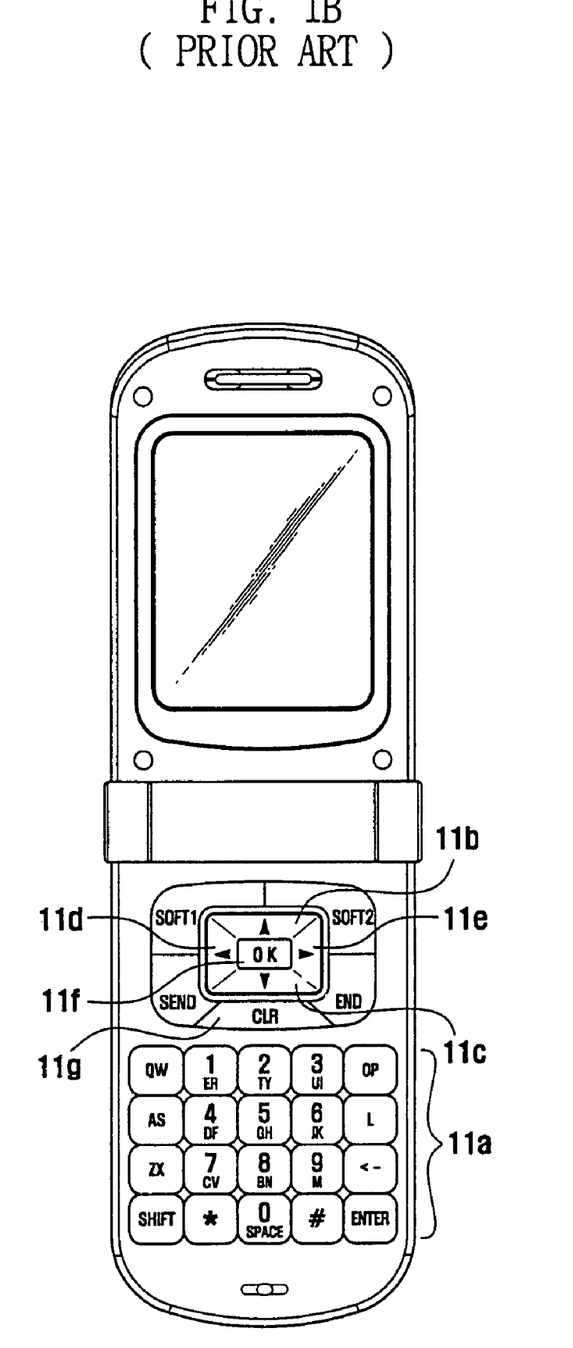

FIGS. 1A and 1B are schematic views showing two types of keypads of a conventional mobile terminal. The keypad shown in FIG. 1A has what is called a 3×4 key arrangement similar to a telephone key configuration, whereas the keypad shown in FIG. 1B has what is called a QWERTY key arrangement following a keyboard key configuration. In the former keypad, each key has three or more letters allocated thereto. Similarly, in the latter keypad, each key has two or more letters allocated thereto.

To input a letter in such a conventional mobile terminal, a user has to often repeatedly press a key to which a letter for input belongs. For example, in case four letters 'PQRS' are allocated to a certain key, a user must press the same key twice to input the second letter 'Q', and must press the same key four times to input the fourth letter 'S'. Accordingly, such a conventional letter input method may waste time, due to repeated key presses, and further, this may sometimes cause some input errors.

To solve these problems, other letter input methods have been introduced that employ a word dictionary embedded in a mobile terminal. According to these methods, similar words are extracted from the dictionary by comparing key input data with the dictionary and are offered on a display screen for user's choice. These conventional methods may, however, have a limitation that such words offered for the user's choice are only the words contained in the dictionary. Additionally, these methods may fail to efficiently display a number of similar words on the display screen.

SUMMARY OF THE INVENTION

An aspect of the present invention is to provide a letter input method for reducing key presses and enabling a user to conveniently input a letter.

Another aspect of the present invention is to provide a letter input method for reducing a likelihood of user's input errors.

Still another aspect of the present invention is to provide a letter input method for all sorts of letters including non-dictionary words, such as people's names, e-mail addresses, symbols, and numerals, as well as dictionary-contained words.

Still another aspect of the present invention is to provide a letter input method for efficiently displaying a number of similar words on a display screen.

According to an of the present invention, provided is a method of inputting letters in a mobile terminal by using letter keys each of which has at least one letter allocated thereto. The method includes determining whether there is an input of the letter keys; extracting first proposed letter sets corresponding to the input of the letter keys; displaying the extracted first proposed letter sets on a screen of the mobile terminal; extracting second proposed letter sets based on selected one of the first proposed letter sets; displaying the extracted second proposed letter sets on the screen; determining whether one of the second proposed letter sets is selected; and receiving the selected second proposed letter set as input data.

In the method, the first proposed letter sets may be extracted from combinations of letters allocated to the inputted letter keys, and the second proposed letter sets may include letters of the selected first proposed letter set. Furthermore, the first and second proposed letter sets may be extracted from either a dictionary database or a user database according to the input of the letter keys.

According to another embodiment of the present invention, a method of inputting letters in a mobile terminal by using letter keys each of which has at least one letter allocated thereto, includes receiving an input from at least two letter keys; extracting first proposed letter sets from combinations of letters allocated to the inputted letter keys; selecting one of the extracted first proposed letter sets; receiving a further input from the letter key; further extracting the first proposed letter sets by combining the selected first proposed letter set with letters allocated to the further inputted letter key; selecting one of the further extracted first proposed letter sets; and receiving the selected one of the further extracted first proposed letter sets as input data.

BRIEF DESCRIPTION OF THE DRAWINGS

The above and other objects, features, and advantages of the present invention will become more readily apparent from the following detailed description, when taken in conjunction with the accompanying drawings, in which.

DETAILED DESCRIPTION OF THE PREFERRED EMBODIMENTS

Non-limiting embodiments of the present invention will now be described more fully hereinafter with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Well-known structures and processes are not described or illustrated in detail to avoid obscuring the essence of the present invention.

Among terminologies used herein, a 'letter' includes a symbol, a number, etc., as well as a letter in a narrow sense. A 'letter key' indicates an alphanumeric key to which several letters are allocated together. A 'proposed letter set' indicates a group of letters extracted according to key input data and offered on a display screen for a user's choice. An 'extraction of proposed letter sets' includes selecting groups of letters in a database, according to key input data, and combining such a selected letter group with some letters allocated to a currently pressed letter key. Furthermore, in comparison with a normal input mode, a mode for executing a letter input method of the present invention will be referred to as a type search input mode.

Figure 2:
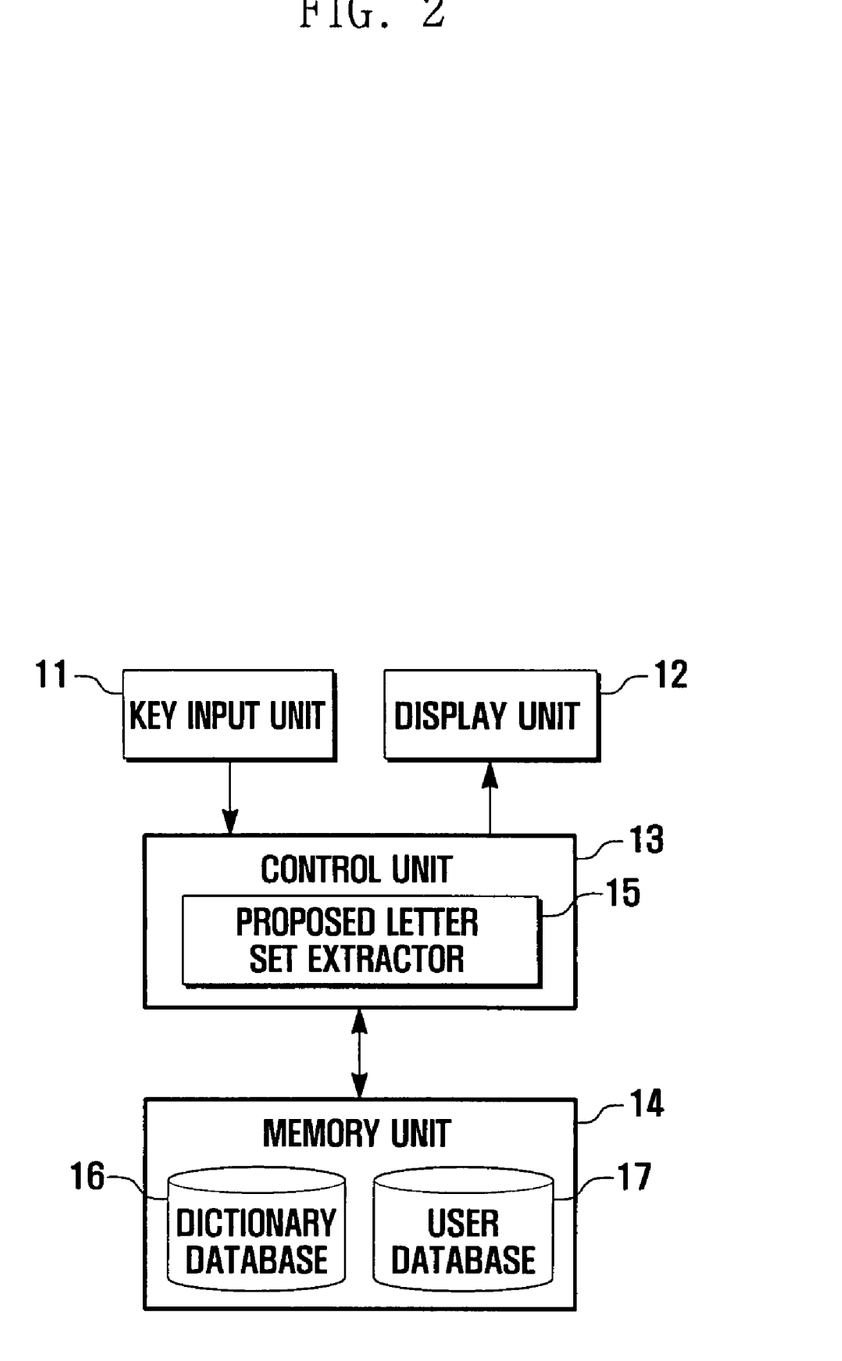
FIG. 2 is a block diagram showing a mobile terminal in accordance with the present invention.

FIG. 2 shows, in a block diagram, a mobile terminal in accordance with the present invention. Referring to FIG. 2, the mobile terminal includes a key input unit 11, a display unit 12, a control unit 13, and a memory unit 14.

The key input unit 11 includes, as illustrated in FIGS. 1A and 1B, alphanumeric keys 11a, four-way navigation keys 11b, 11c, 11d and 11e, an OK key 11f, a back key 11g, and other several function keys. The OK key 11f may be also referred to as a selection key, and the back key 11g may be also referred to as a cancel key or a clear key. Once receiving a user's press actions, the key input unit 11 sends corresponding key input data to the control unit 13.

The display unit 12 is preferably formed of a Liquid Crystal Display (LCD) or other alternative display device. The display unit 12 represents, on a screen, proposed letter sets corresponding to key input data the key input unit 11 sends.

The control unit 13 controls the operation of the mobile terminal. In particular, the control unit 13 has a proposed letter set extractor 15, which receives key input data from the key input unit 11. In addition, the proposed letter set extractor 15 approaches the memory unit 14, extracts some proposed letter sets therefrom according to key input data, and outputs the extracted proposed letter sets to the display unit 12.

The memory unit 14 stores a variety of programs and applications executable in the mobile terminal, and data required for or produced by such execution. The memory unit 14 has a dictionary database 16 and a user database 17. The dictionary database 16 contains a number of commonly used words, and the user database 17 contains non-dictionary words such as names, phone numbers, facsimile numbers, e-mail addresses, etc., which are recorded by a user.

Figure 3:
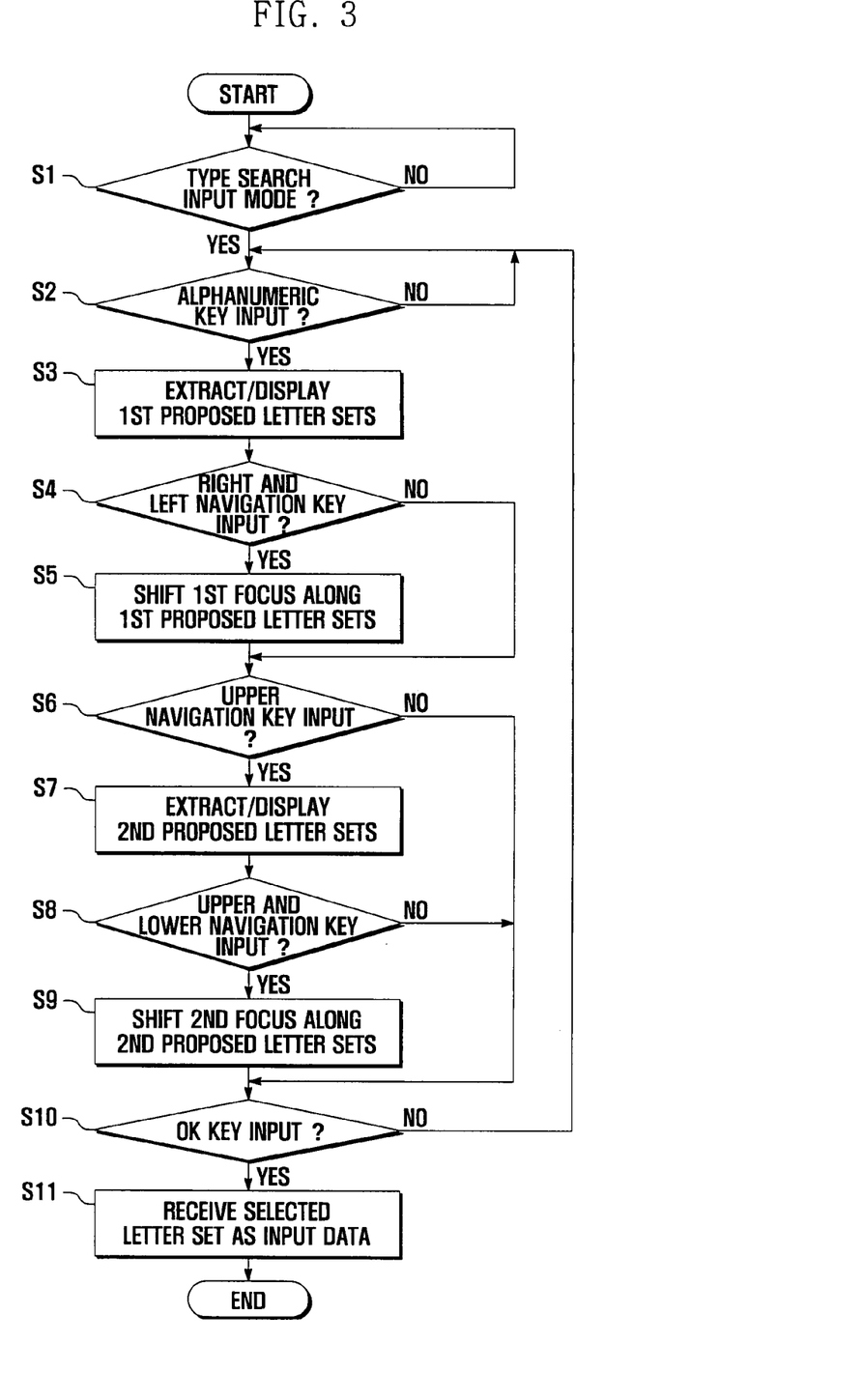
FIG. 3 is a flow diagram showing a method of inputting a letter in a mobile terminal in accordance with an embodiment of the present invention.

FIG. 3 is a flow diagram showing a method of inputting a letter in a mobile terminal according to an embodiment of the present invention. Additionally, FIGS. 6A to 6F are screen views associated with the method shown in FIG. 3. Hereinafter, a description will refer to FIGS. 6A to 6F together with FIG. 3. Furthermore, the following description will employ the mobile terminal shown in FIG. 2 and the keypad shown in FIG. 1B, which is exemplary only and not to be considered as a limitation of the present invention. Other types of mobile terminals and keypads may be also used for the method illustrated in FIG. 3.

The mobile terminal of the present invention has both a normal input mode and a type search input mode, whereas the letter input method of the present invention is available for a type search input mode only. Accordingly, at the outset, the control unit 13 determines whether a type search input mode is selected or not in step S1. A special key input is required to convert from a normal input mode into a type search input mode, and vice versa. For example, a long press of an asterisk (*) key is assigned to convert such input modes.

If a type search input mode is selected, the control unit 13 determines whether there is an input of any alphanumeric key 11a in step S2. Such an input of alphanumeric keys may occur during execution of some applications such as storing or editing phone numbers, writing or editing messages, writing or editing schedules, and so forth.

If there is an input of the specific alphanumeric key 11a, the proposed letter set extractor 15 receives key input data and, based on the received key input data, searches both the dictionary database 16 and the user database 17. Then, in step S3, the proposed letter set extractor 15 extracts first proposed letter sets from both database 16 and 17 and displays the extracted letter sets on the display unit 12. If necessary, a target database for extraction may be selected by a user.

Figure 6A:
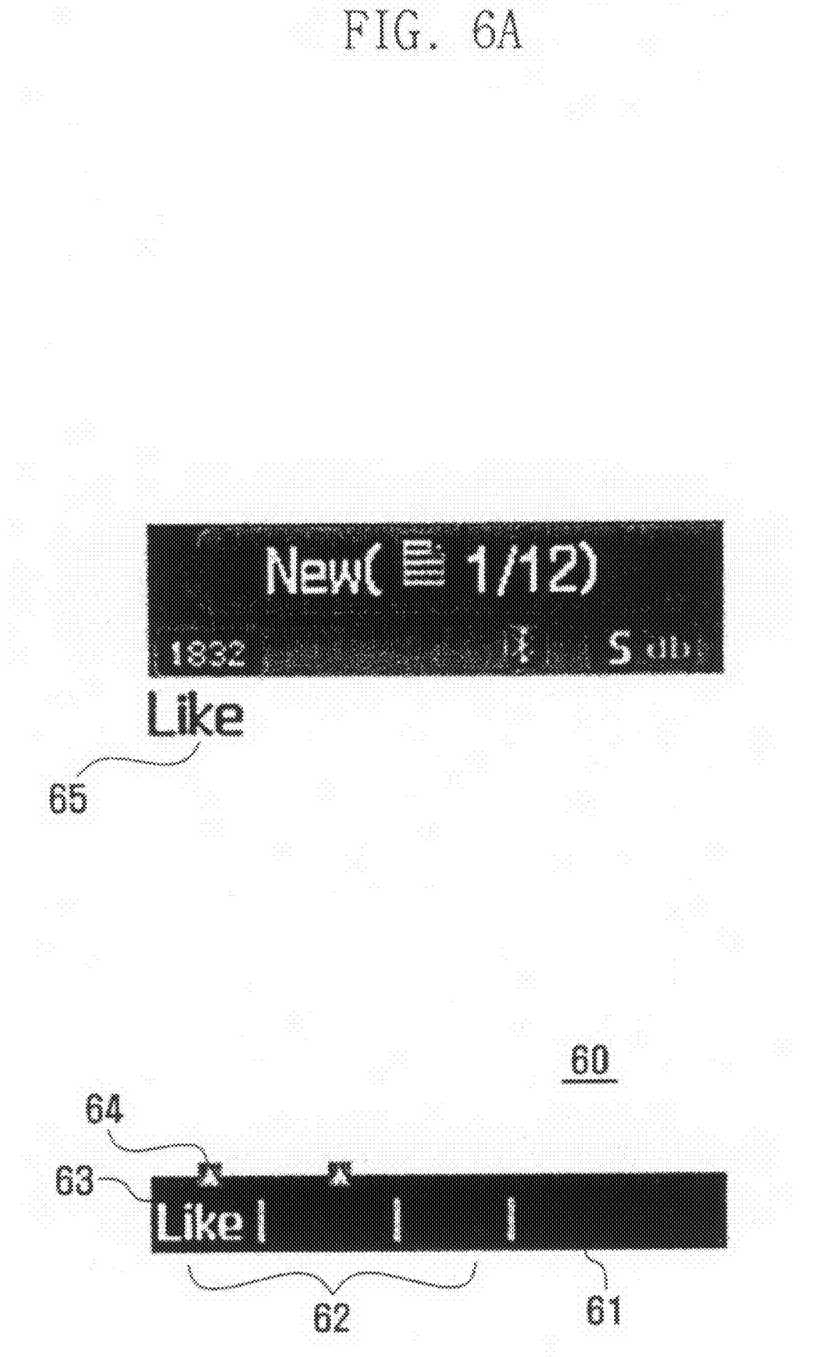
FIGS. 6A to 6F are screen views showing a method of inputting a letter in a mobile terminal in accordance with an embodiment of the present invention.

FIG. 6A exemplarily illustrates this step S3. If a user presses in sequence four alphanumeric keys 11a 'L', 'UI', 'JK', and 'ER' of the keypad shown in FIG. 1B, first proposed letter sets 62 'Like', 'Luke' and 'Lije' are displayed at a lowermost bar 61 on the screen. At the same time, a first focus 63 is located at the leftmost set (Like) of the first proposed letter sets 62, and the same set (Like) is exhibited as output letters 65 in an input window 60. If the extracted first proposed letter sets 62 are greater in number than actually displayed at the lowermost bar 61, non-displayed sets (e.g., 'Lukr') can be exhibited by a press of navigation keys.

As discussed above, when some alphanumeric keys 11a are pressed in order, the first proposed letter sets 62 are extracted depending on the combination of letters allocated to the pressed keys. However, the first proposed letter sets 62 are not derived from every possible combination. Determination of the first proposed letter sets 62 is based on database search results and location of the first focus 63.

The following is an example description about extraction rules for the first proposed letter sets 62. If three alphanumeric keys 11a 'L', 'UI' and 'JK' are inputted in sequence, four combinations of letters are theoretically possible, namely, 'Luj', 'Luk', 'Lij' and 'Lik'. However, let's suppose that only three combinations 'Luk', 'Lij' and 'Lik' are determined as the first proposed letter sets 62. Then, if the fourth key 'ER' is pressed, theoretically possible combination is six, i.e., 'Luke', 'Lukr', 'Lije', 'Lijr', 'Like' and 'Likr'. Among them, if only three combinations 'Luke', 'Lije' and 'Like' are retrieved from the databases 16 and 17, they become the first proposed letter sets 62.

However, the first proposed letter sets 62 are not limited to the above-mentioned three combinations only and include other combinations. When the first focus 63 is located at the specific letter set and then a letter key is pressed, the specific letter set is combined with letters allocated to the currently inputted key. Resultant combinations are added to the first proposed letter sets 62. In the above case, if the first focus 63 is located at a specific letter set 'Luk' and then the 'ER' key is pressed, two combinations 'Luke' and 'Lukr' also become the first proposed letter sets 62. Since 'Luke' is duplicated, four combinations 'Luke', 'Lije', 'Like' and 'Lukr' are finally extracted as the first proposed letter sets 62.

As discussed above, to extract the first proposed letter sets 62, the location of the first focus 63 is also considered in addition to the database search results. Accordingly, it is possible to input any words even though they are not contained in the databases 16 and 17. In the above case, if a user desires to input 'Likr' absent in the databases 16 and 17, he or she will place the first focus 63 at 'Lik' and press the 'ER' key. Then 'Likr' will be displayed as one of the first proposed letter sets 62 and inputted by a user's selection.

Figure 6B:
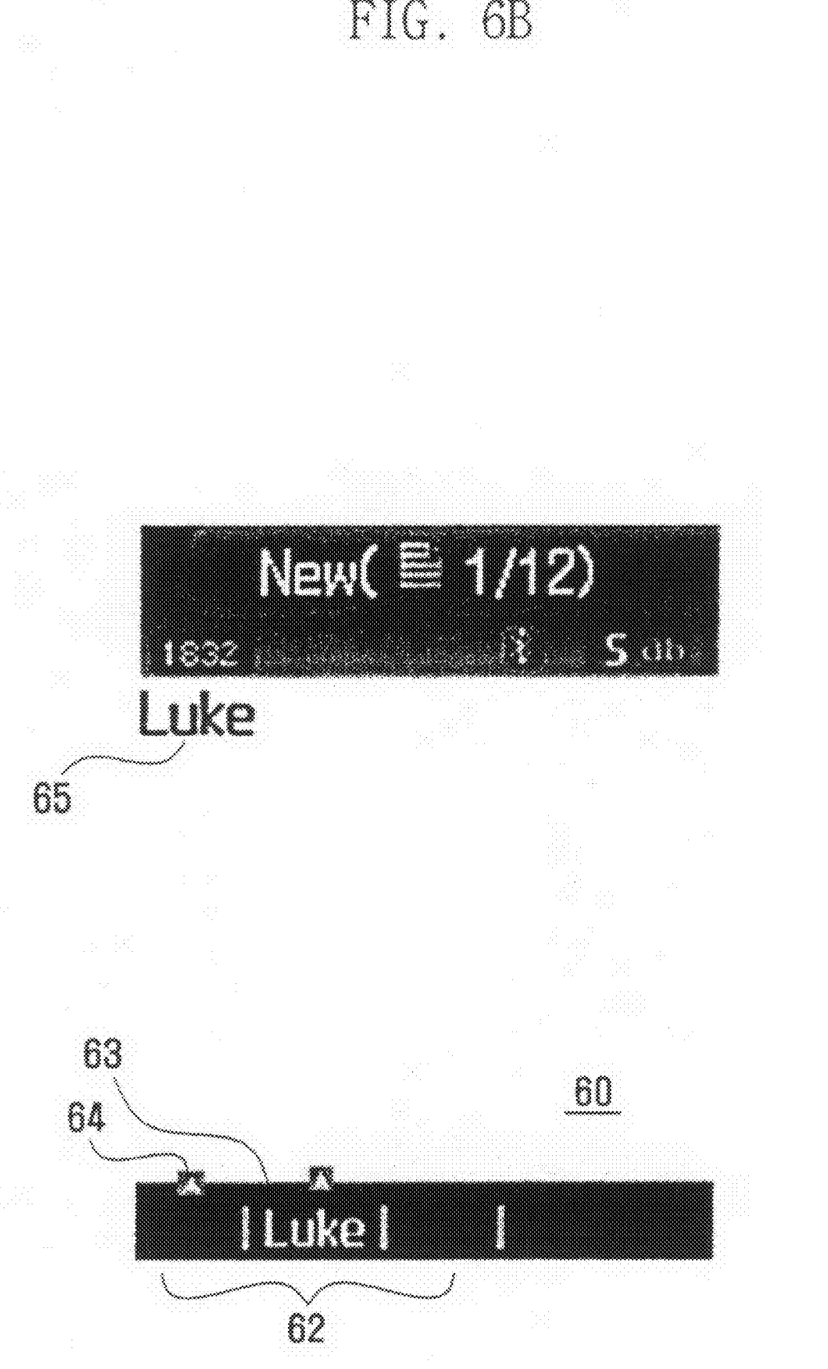

Thereafter, if a user presses right and left navigation keys 11d and 11e, the first focus 63 moves along the first proposed letter sets 62. That is, after displaying the extracted first proposed letter sets 62, in step S4 the control unit 13 determines whether there is an input of the right and left navigation keys 11d and 11e. If there is such an input, in step S5 the control unit 13 shifts the first focus 63 to another position among the first proposed letter sets 62 according to an input of the right and left navigation keys 11d and 11e. FIGS. 6A and 6B illustrate an example movement of the first focus 63. As shown in FIGS. 6A and 6B, the first focus 63 located at 'Like' is shifted rightward to 'Luke' by an input of the right navigation key 11e, and thereby the output letters 65 in the input window 60 are also changed from 'Like' to 'Luke'.

And then, in step S6 the control unit 13 determines whether there is an input of an upper navigation key 11b. If such an input occurs, in step S7 the proposed letter set extractor 15 extracts second proposed letter sets 66 and displays them on the display unit 12. The extraction of the second proposed letter sets 66 is based on the search results of the databases 16 and 17. Furthermore, the second proposed letter sets 66 always include letters of currently selected first proposed letter set 62. For example, when a specific first proposed letter set 62 'Like' is selected, the second proposed letter sets 66 are 'Like', 'Likeable', 'Likenesses', 'Likening', 'Likens', etc.

Figure 6C:
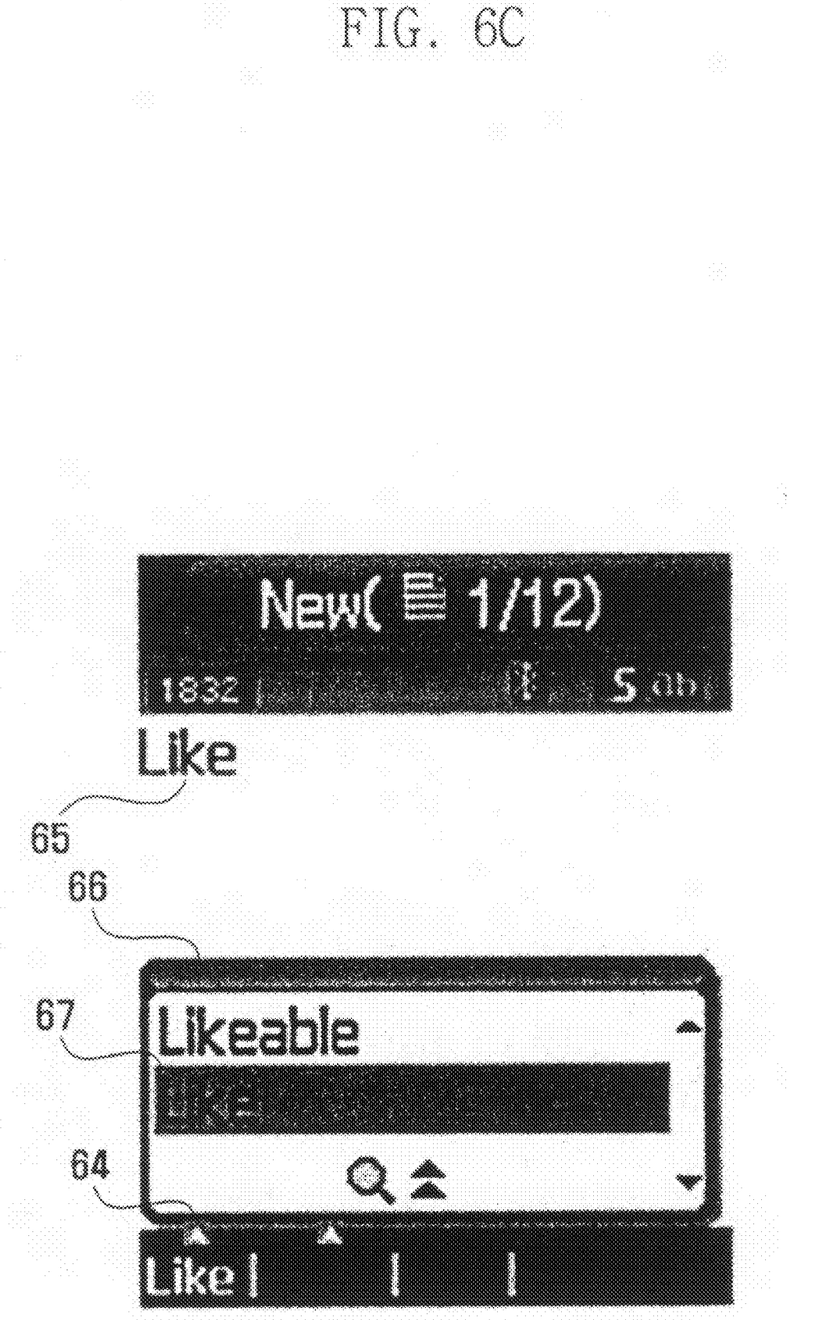
Figure 6D:
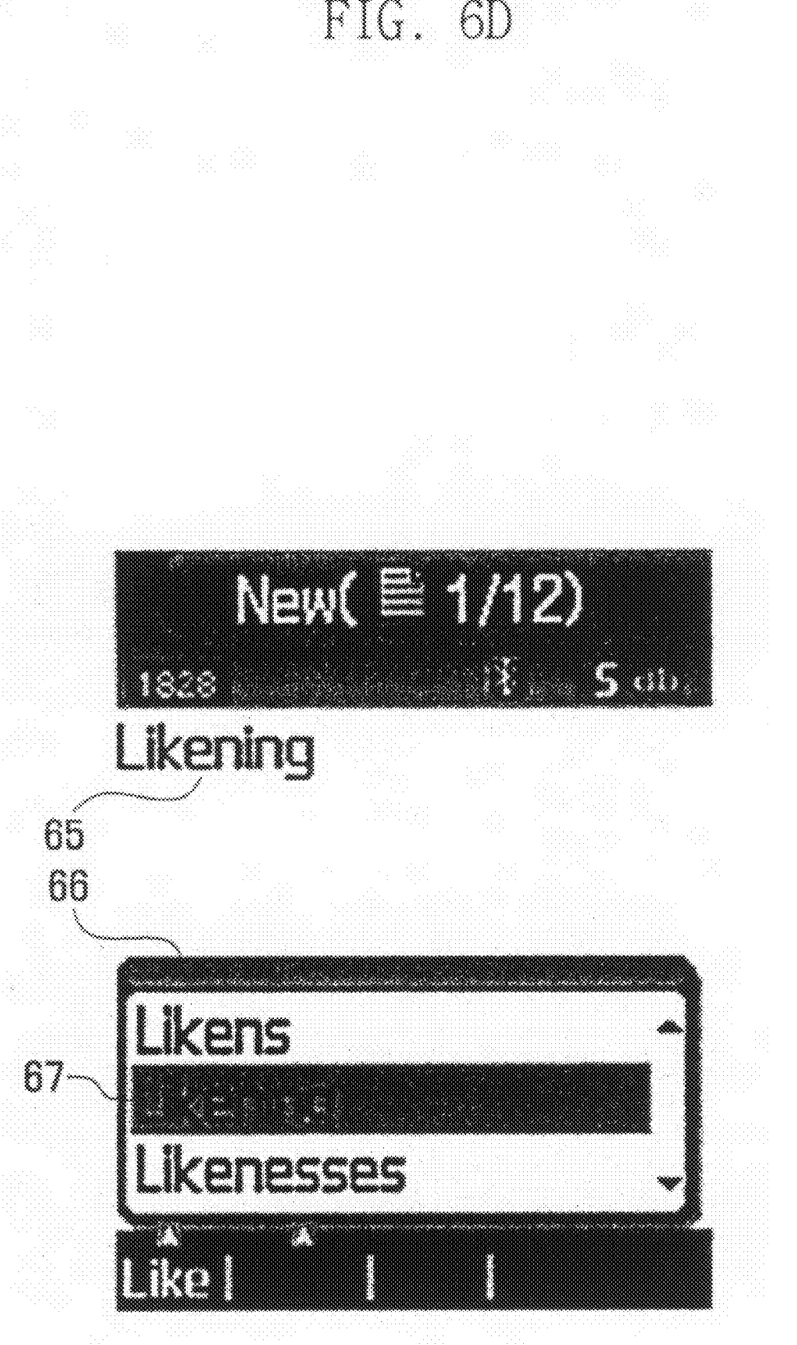
Figure 6E:
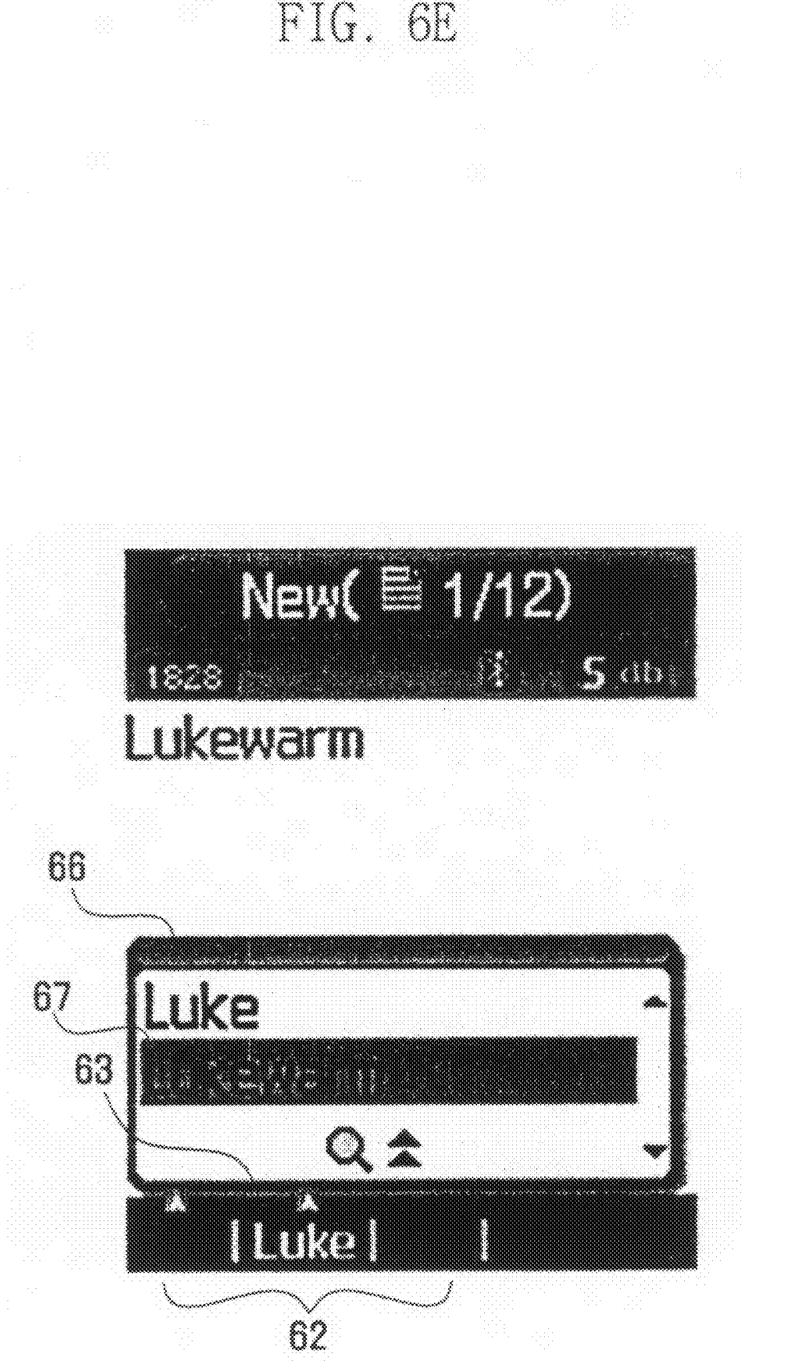

As shown in FIGS. 6A to 6E, if any first proposed letter set 62 involves second proposed letter sets 66, the proposed letter set extractor 15 displays an upward icon 64 to the corresponding first proposed letter set 62 on the screen. Instead of the upward icon 64, any other graphical members can be used for informing the existence of the second proposed letter sets 66. When the upward icon 64 is pressed, the second proposed letter sets 66 are displayed. FIGS. 6C to 6E show examples of the displayed second proposed letter sets 66.

When a user presses upper and lower navigation keys 11b and 11c, a second focus 67 moves along the second proposed letter sets 66. That is, after the second proposed letter sets 66 are displayed, in step S8 the control unit 13 determines whether there is an input of the upper and lower navigation keys 11b and 11c. If there is such an input, in step S9 the control unit 13 shifts the second focus 67 to another position among the second proposed letter sets 66 according to an input of the upper and lower navigation keys 11b and 11c. FIGS. 6C and 6D illustrate an example movement of the second focus 67. As shown in FIGS. 6C and 6D, the second focus 67 located at 'Like' is shifted upward to 'Likening' by an input of the upper navigation key 11b, and thereby the output letters 65 in the input window 60 are also changed from 'Like' to 'Likening'.

On the other hand, when the right and left navigation keys 11e and 11d are inputted with the second proposed letter sets 66 launched, the second proposed letter sets 66 are changed according to the shift of the first focus 63 as shown in FIG. 6E.

Next, the control unit 13 determines whether there is an input of an OK key 11f in step S10. If there is an input of the OK key, in step S11 the control unit 13 receives the selected first or second proposed letter set 62 or 66 as input data. If the first focus 63 is located at a specific one of the first proposed letter sets 62 without the second proposed letter sets 66 launched, the specific first proposed letter set 62 is selected. Otherwise, if the second focus 67 is located at a specific one of the second proposed letter sets 66 launched, the specific second proposed letter set 66 is selected. The selected letter set, regardless of first and second, is the same as the output letters 65 in the input window 60. The function of selecting the proposed letter set may be assigned to any key other than the OK key 11f.

Figure 6F:
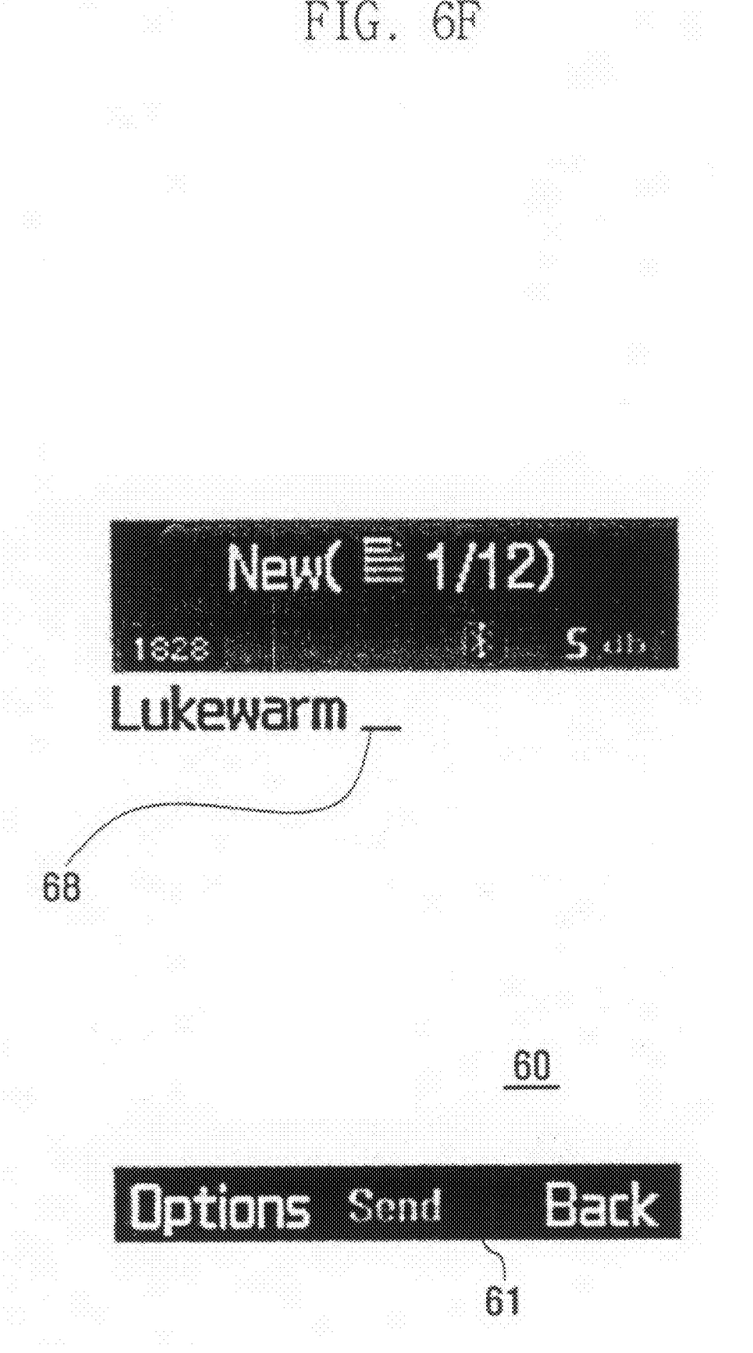

After letters are input through selection of the proposed letter set, the first and second proposed letter sets 62 and 66 disappear as shown in FIG. 6F. Furthermore, a cursor 68 appears on the input window 60 for the next input of letters.

Figure 4:
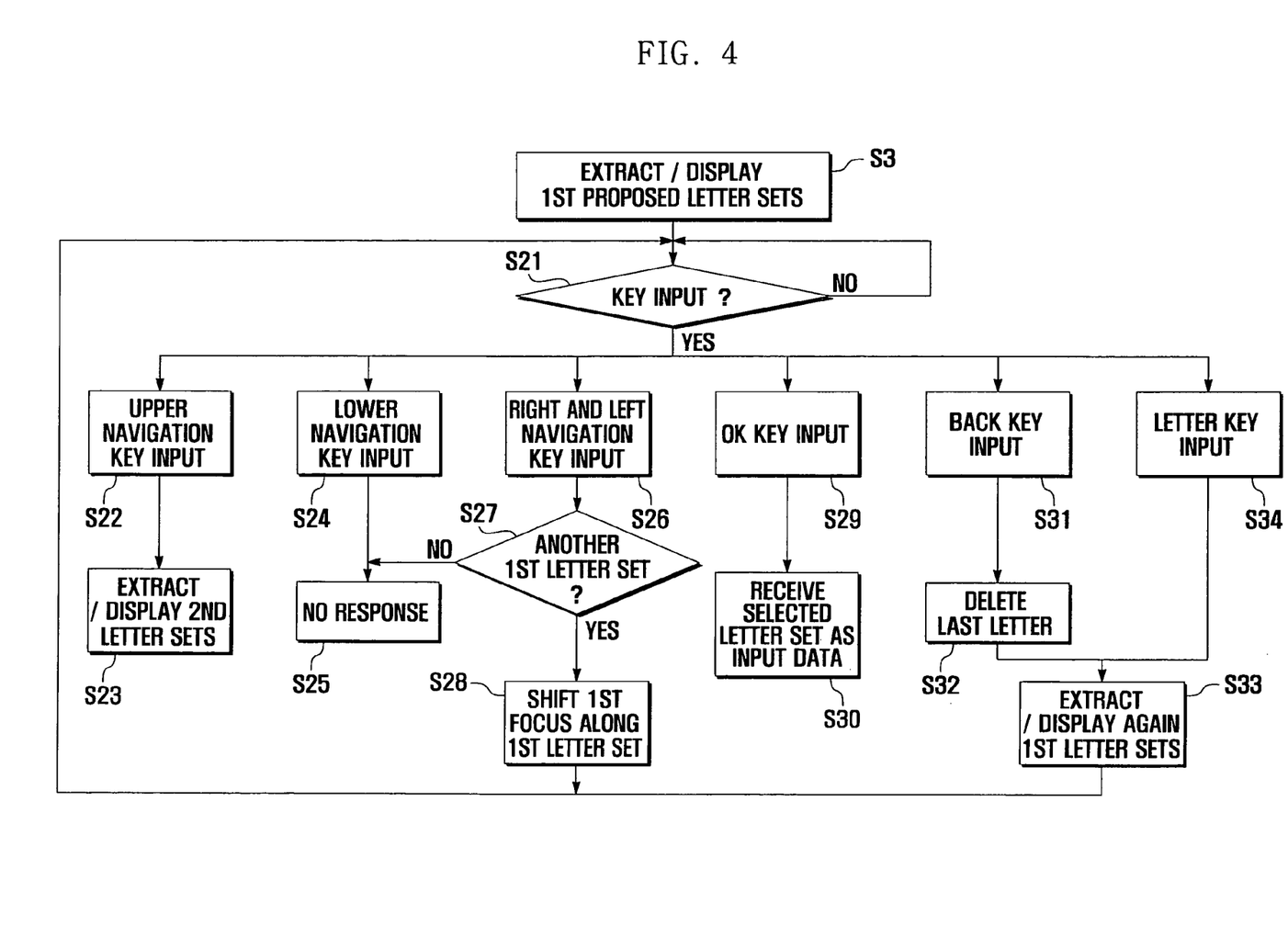
FIG. 4 is a flow diagram showing a method of inputting a letter in a mobile terminal in accordance with another embodiment of the present invention.

According to another embodiment of the present invention, the process after step S3 may be varied depending on types of a key input. FIG. 4 is a flow diagram showing a method of inputting a letter in a mobile terminal in accordance with another embodiment of the present invention.

Referring to FIG. 4, after displaying first proposed letter sets 62 in step S3, the control unit 13 determines whether there is a key input in step S21. If there is any key input, the control unit 13 performs different operations according to types of a key input.

As discussed above, when an input of an upper navigation key 11b occurs in step S22, second proposed letter sets 66 are extracted and displayed in step S23. Furthermore, an input of a lower navigation key 11c in step S24 brings about no response in step S25. In an alternative embodiment, an input of a lower navigation key 11c may be assigned to canceling a display of first proposed letter sets 62.

As also discussed above, when an input of right and left navigation keys 11e and 11d occurs in step S26, in step S27 the control unit 13 determines whether there exists another first proposed letter set 62 to which a first focus 63 can move. If there is any first proposed letter set 62, in step S28 the first focus 63 is shifted according to a key input. Otherwise, if there is no first proposed letter set 62, an input of the right and left navigation keys 11e and 11d brings about no response in step S25. In an alternative embodiment, a first focus 63 can move in a cycle along the first proposed letter sets 62 in response to an input of right and left navigation keys 11e and 11d. For example, if the right navigation key is pressed continually after a press of the asterisk (*) key, the first focus moves rightward in a cycle.

As discussed above, when an input of the OK key occurs in step S29, the control unit 13 receives a selected letter set as input data in step S30. For example, if there is a desired letter set in the first proposed letter sets, a user may select immediately the desired letter set without further displaying the second proposed letter sets.

When an input of the back key 11g occurs in step S31, in step S32 the control unit 13 deletes the last letter of the output letters displayed in the input window 60. Then, based on the remaining letters, the control unit 13 extracts again the first proposed letter sets 62 and displays them in step S33.

Once any letter key is input in step S34, the control unit 13 extracts again and displays the first proposed letter sets 62 according to the letter key input in step S33. As discussed above, the first proposed letter sets 62 extracted again are based on combinations of a specific letter set where the first focus 63 is located and other letters allocated to the currently input key.

Figure 5:
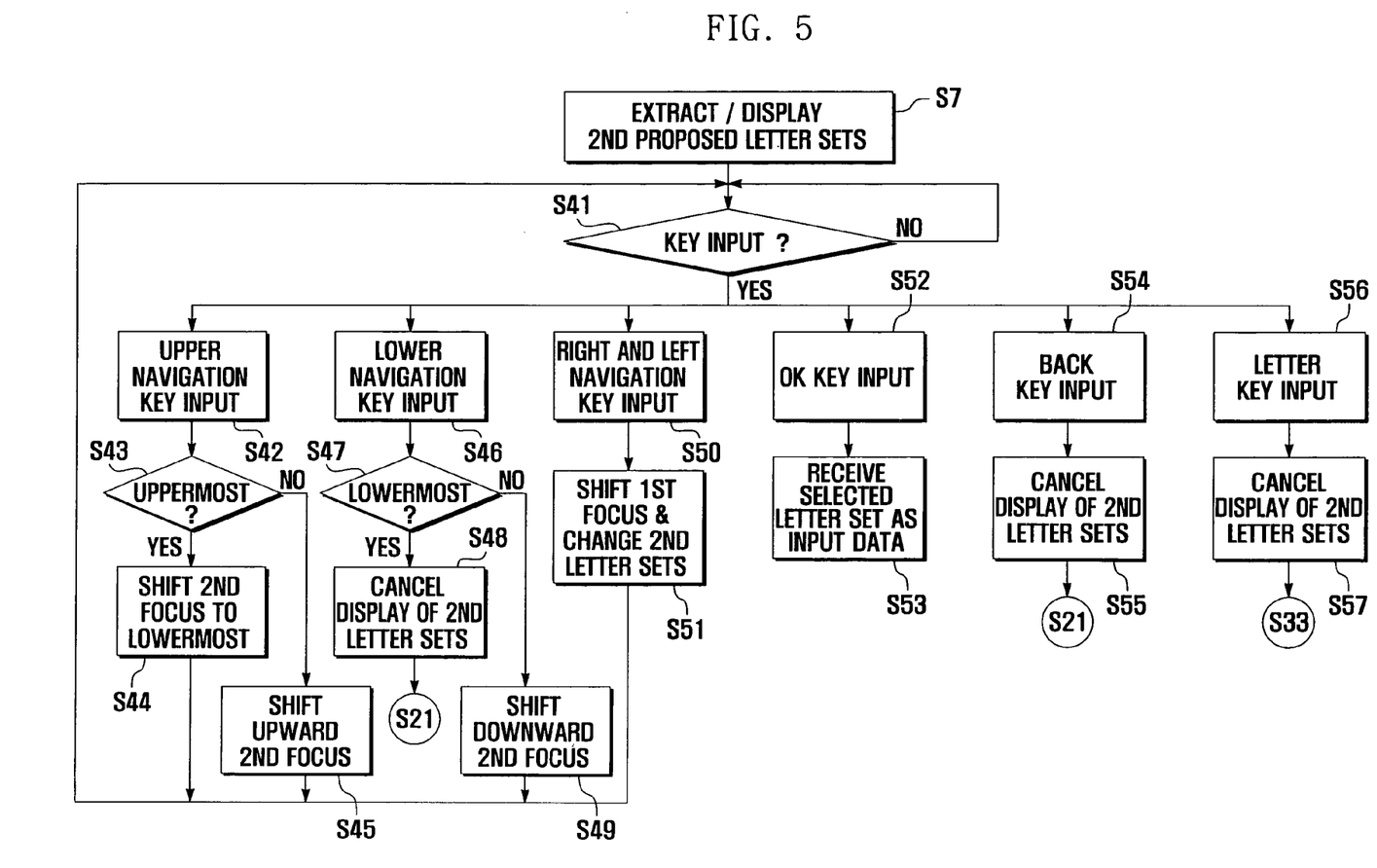
FIG. 5 is a flow diagram showing a method of inputting a letter in a mobile terminal in accordance with still another embodiment of the present invention.

According to still another embodiment of the present invention, a process after step S7 shown in FIG. 3 may vary depending on types of key input. FIG. 5 is a flow diagram showing a method of inputting a letter in a mobile terminal in accordance with still another embodiment of the present invention.

Referring to FIG. 5, after displaying second proposed letter sets 66 in step S7, the control unit 13 determines whether there is a key input in step S41. If there is any key input, the control unit performs different operations according to types of key input.

When an input of an upper navigation key 11b occurs in step S42, a control unit 13 determines whether a second focus 67 is located at an uppermost letter set of second proposed letter sets 66 in step S43. If the second focus 67 is located at the uppermost letter set, the control unit 13 shifts the second focus 67 to a lowermost letter set in step S44. Otherwise, if the second focus 67 is not located at the uppermost letter set, in step S45 the control unit 13 shifts upward the second focus 67 according to a key input.

When an input of a lower navigation key 11c occurs in step S46, the control unit 13 determines whether the second focus 67 is located at the lowermost letter set of the second proposed letter sets 66 in step S47. If the second focus 67 is located at the lowermost letter set, the control unit 13 cancels a display of the second proposed letter sets 66 in step S48 and performs again the above discussed step S21. Otherwise, if the second focus 67 is not located at the lowermost letter set, in step S49 the control unit 13 shifts downward the second focus 67 according to a key input.

When an input of the right and left navigation keys 11e and 11d occurs in step S50, in step S51 the control unit 13 not only shifts the first focus 63 to another first letter set, but also changes the displayed second letter sets according to a shift of the first letter set.

When an input of an OK key 11f occurs in step S52, the control unit 13 receives the selected letter set as input data in step S53.

When an input of a back key 11g occurs in step S54, the control unit 13 cancels a display of the second proposed letter sets 66 in step S55 and performs again the above discussed step S21.

Additionally, when any letter key is input in step S56, the control unit 13 also cancels a display of the second proposed letter sets 66 in step S57 and performs again the above discussed step S33.

As fully discussed above, the letter input method according to the present invention allows searching both the dictionary database 16 and the user database 17 in response to an input of the letter key, extracting proposed letter sets 62 and 66 based on the search results, and displaying the extracted letter sets on an input window 60 with two separate levels.

Accordingly, a user can select desired letter sets instead of inputting letters one by one. That is, the letter input method of the present invention enables a user to conveniently input letters with a reduced number of key presses and with a reduced likelihood of input errors. Furthermore, a two-level display scheme of the proposed letter sets 62 and 66 helps a user easily input letters and allows an efficient display of the proposed letter sets 62 and 66 on a screen limited in area.

Additionally, the letter input method of the present invention permits inputting non-dictionary words, e.g., names, e-mail addresses, symbols, and numerals, by using the user database 17 as well as the dictionary database 16. Moreover, since the location of the first focus 63 is considered together with the database search results during extraction of the first proposed letter sets 62, it is possible to input any words even though they are not contained in database.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A method of inputting letters in a mobile terminal using letter keys each of which has at least one letter allocated thereto, the method including:
   determining whether there is an input of the letter keys;
   extracting first proposed letter sets from combinations of letters corresponding to the input of the letter keys;
   displaying the extracted first proposed letter sets on a screen of the mobile terminal, wherein the displaying of the first proposed letter sets includes locating a first focus at one of the first proposed letter sets;
   selecting one of the extracted first proposed letter sets;
   receiving the selected first proposed letter set as input data when a first key is input;
   extracting second proposed letter sets based on the selected first proposed letter set when a second key is input;
   displaying the extracted second proposed letter sets on the screen, wherein the displaying of the second proposed letter sets includes locating a second focus at one of the second proposed letter sets;
   determining whether one of the second proposed letter sets is selected;
   receiving the selected second proposed letter set as input data;
   receiving an input of a specific key after the first proposed letter sets are displayed;
   deleting a last letter of the first proposed letter set at which the first focus is located; and
   extracting again the first proposed letter sets except the deleted last letter,
   wherein the extracted second proposed letter sets include each letter of the selected one of the first proposed letter sets.

2. The method of claim 1, wherein the letter keys have one of a telephone key configuration and a QWERTY key arrangement.

3. The method of claim 1, further comprising:
   before determining whether there is an input of the letter keys, determining whether a type search input mode is selected.

4. The method of claim 1, wherein the first proposed letter sets are extracted from combinations of letters allocated to the input letter keys.

5. The method of claim 1, wherein the first and second proposed letter sets are extracted from one of a dictionary database and a user database according to the input of the letter keys.

6. The method of claim 5, wherein the user database contains non-dictionary words.

7. The method of claim 5, wherein the user database includes names, phone numbers, facsimile numbers, and e-mail addresses.

8. The method of claim 5, wherein the first proposed letter sets are specific combinations that are searched from the dictionary database or the user database among combinations of letters allocated to the input letter keys.

9. The method of claim 5, wherein the second proposed letter sets are specific letters that are searched from the dictionary database or the user database among letters including the selected first proposed letter set.

10. The method of claim 1, wherein the first proposed letter sets are displayed at a lowermost portion of the screen.

11. The method of claim 1, wherein the second proposed letter sets are displayed in an input window on the screen.

12. The method of claim 1, wherein the second proposed letter sets are extracted when there is an input of a specific key.

13. The method of claim 12, wherein the specific key is an upper navigation key.

14. The method of claim 1, further comprising:
receiving an input of navigation keys after the first proposed letter sets are displayed; and
shifting the first focus along the first proposed letter sets according to the input of the navigation keys.

15. The method of claim 1, further comprising:
receiving as input data the first proposed letter set at which the first focus is located.

16. The method of claim 1, further comprising:
receiving a further input of the letter key after the first proposed letter sets are displayed; and
extracting again the first proposed letter sets by combining the first proposed letter set, at which the first focus is located, with letters allocated to the further input letter key.

17. The method of claim 1, wherein the displaying of the first proposed letter sets includes displaying a graphical member that indicates the existence of the second proposed letter sets.

18. The method of claim 1, further comprising:
receiving an input from navigation keys after the second proposed letter sets are displayed; and
shifting the second focus along the second proposed letter sets according to the input of the navigation keys.

19. The method of claim 1, further comprising:
receiving an input of a lower navigation key after the second proposed letter sets are displayed; and
canceling a display of the second proposed letter sets when the second focus is located at a lowermost one of the second proposed letter sets.

20. The method of claim 1, further comprising:
receiving an input from a specific key after the second proposed letter sets are displayed; and
canceling a display of the second proposed letter sets.

21. The method of claim 1, further comprising:
receiving a further input from the letter key after the second proposed letter sets are displayed;
canceling a display of the second proposed letter sets; and
extracting again the first proposed letter sets by combining the first proposed letter set, at which the first focus is located, with letters allocated to the further inputted letter key.

22. The method of claim 1, wherein selecting one of the second proposed letter sets is determined by an input of a specific key.

* * * * *